Feb. 20, 1962 R. MARSH 3,021,746
FASTENING DEVICE
Filed March 7, 1956
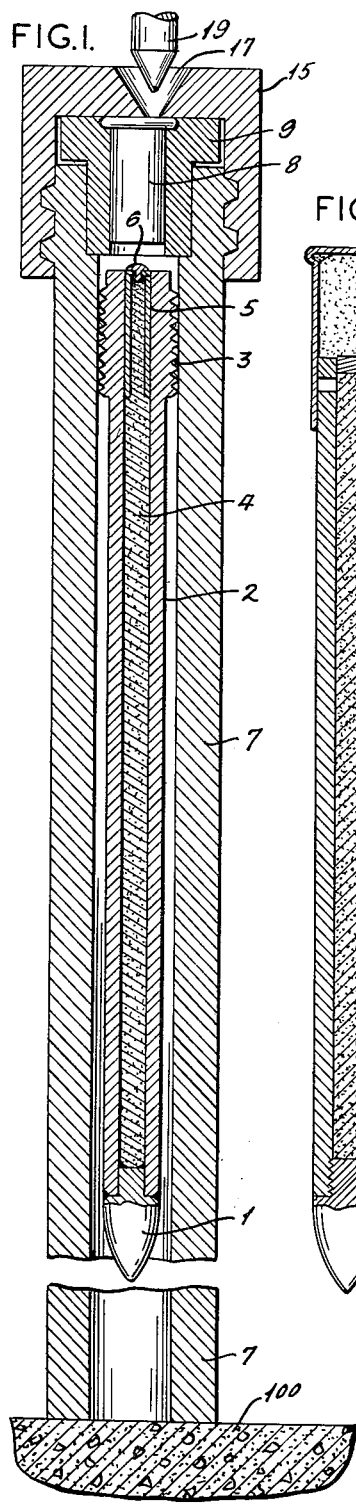
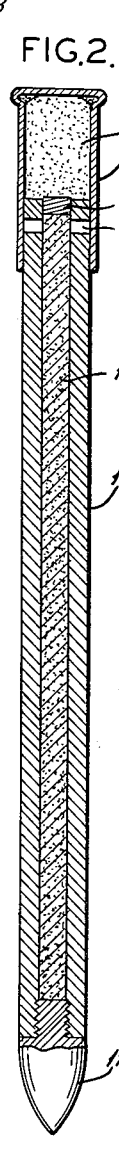
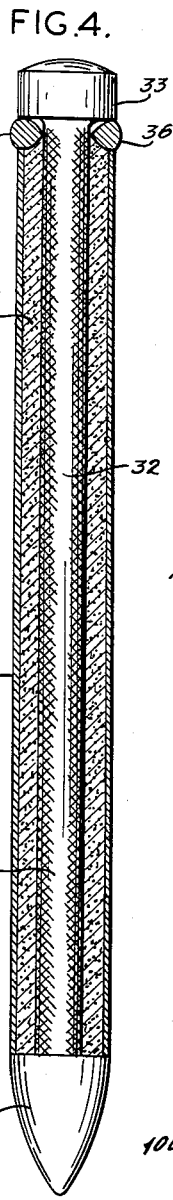
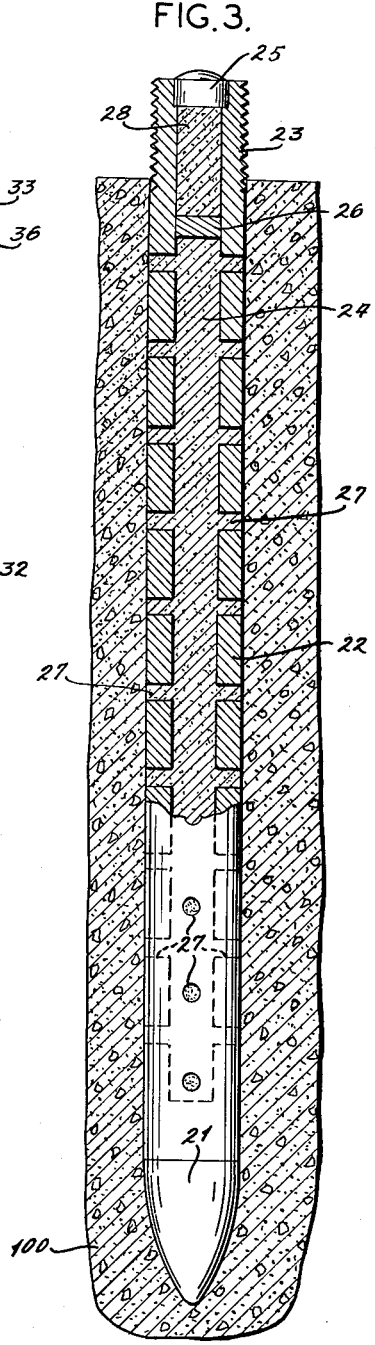
INVENTOR:
ROGER MARSH
By John T. Wilkins & Lionel E. Hoff
ATTORNEYS.

3,021,746
FASTENING DEVICE
Roger Marsh, Hudson, Ohio, assignor, by mesne assignments to Olin Mathieson Chemical Corporation, a corporation of Virginia
Filed Mar. 7, 1956, Ser. No. 570,175
11 Claims. (Cl. 85—10)

This invention relates to fastening and more particularly to driving of fasteners into fusible materials by means of an explosive actuated driver.

In securing structures upon supporting materials, explosive driven fasteners have been found to possess great advantage on account of the speed and reliability with which such fasteners can be driven. Especially, under extremely unfavorable job conditions such as are encountered in the frigid regions of the far north and in the Antarctic, it is desirable to employ the rapid fastening made possible with explosive driven fasteners. However, the materials here encountered such as frozen tundra, frozen chat, gravel, or sand, packed snow and ice are normally not suitable for supporting the heretofore known explosive driven studs or pins. The reason is that these materials are often little more than an aggregate held together with frozen water, if not all or largely of ice, and are so disrupted by penetration of the fastener as to prevent its being secured. In driving studs, pins, stakes and the like of the heretofore usual type into aggregate material, particularly frozen aggregate such as sand, gravel and the like, the accompanying crushing of the material impairs the hold all too frequently. This disadvantage, which also occurs with such fasteners driven into other fusible materials such as macadam and other paving mixes consisting largely of particles such as sand or the like embedded in the bituminous substance, is largely overcome by means of the improved fastener of this invention.

Therefore, an object of this invention is to provide a new and improved fastener of the type described to accomplish fastening in fusible materials such as frozen sand, soil, gravel, packed snow and ice. Another object is to provide a new and improved method of fastening and a novel fastener. Other objects and advantages will become obvious from the description of various embodiments which follow when taken together with the accompanying drawing in which:

FIG. 1 is a side view in cross section showing one embodiment of the fastener and a portion of a suitable driving tool positioned in readiness for projection of the fastener into the surface of a body of supporting material into which the fastener is to penetrate and remain impaled therein;

FIG. 2 is a side view in cross section of a second embodiment;

FIG. 3 is a side view in partial cross section of a third embodiment; and

FIG. 4 is a side view in partial cross section of a further embodiment.

In accordance with this invention, there is provided a projectible fastener which furnishes heat so that after it is driven it may be better secured by reason of melting and resolidification of at least a portion of the supporting material adjacent the fastener. A self-heating fastener, stud or pin is provided. This is accomplished by charging the fastener with a heating or calefacient composition and preferably by placing within the fastener a core of such calefacient material. This material is charged into a suitable cavity in the fastener such as into a hollow bore within the shank portion of the fastener which consists of a suitable heat resistant and conductive material of adequate strength such as steel and the like. Under some circumstances a high temperature resistant type alloy may advantageously be used. In order that the heating composition can be readily set off, any suitable ignition means is preferably also provided.

The invention may take various forms. According to one embodiment, substantially all of the bore of an elongated fastener shank is charged with a heating composition and the accessible end of the composition is provided with ignition means. According to another embodiment, the bore is first charged with sufficient heating composition to accomplish the desired fusion and also charged with a propellant. In order to extend the heating effect of the fastener over a wider zone, it is provided in accordance with a still further embodiment with a series of perforations distributed along the surface of the fastener to provide discharge openings extending between the cavity containing the calefacient material and the heating surface of the fastener. External fins or projections may also be provided for heat exchange. Still further improvement of the resultant grip between the fastener of this invention and the recoalescent material is obtained by means of such perforations or fins which like pitting, knurling, grooving or the like produce a roughening of the surface of the fastener and recesses into which some recoalescence may occur.

The heating composition may consist of any suitable mixture such as particles of iron together with sulfur, a suitably modified thermit composition of iron oxide and aluminum powder and the like. A mixture including a chlorate, such as potassium chlorate, or perchlorates, nitrates or other oxidizers together with any suitable fuel such as charcoal, saw dust, sulfur, paraffin or particles of magnesium may also be employed. Mixtures of the type employed in railroad signal fuses, for example, or heating mixtures of the type employed to accomplish localized vulcanization of rubber are suitable. Any type of heating mixture capable of generation of sufficient heat to fuse at least the immediately surrounding target material is contemplated.

When the shank of the fastener is perforated, the heating composition may also include a fugitive medium such as a metal or liquid, such as water, which will melt or vaporize and flow out through the perforations to again solidify and improve the bond between the fastener and the surrounding frozen material. Such medium in solidifying forms adherent extensions from the fastener shank.

The hollow fastener containing the heating material is preferably also provided with an igniting mixture of the type adapted to set off the calefacient material either simultaneously with the driving of the fastener or after the fastener has been driven. The fastener may be designed so as to be automatically self-igniting or so as to be ignitable manually at the will of the operator after he has found the fastener to be driven suitably in other respects. The igniter may be of the percussion type which requires a blow as from a hammer or from the propellent charge or it may be of the friction match type which requires a glancing blow or rubbing action to set it off and ignite the composition. A thermal type of igniter of material more readily kindled than the calefacient material may also be employed. Since according to still a further aspect of the invention the fastener may be provided with a fixed charge of propellent material such as smokeless powder or the like, the igniter may be part of a train consisting of a charge of burning composition and a charge of propellent composition with the igniter between them. The charge, however, is ordinarily in a separate cartridge case having a primer and the fastener may be so designed that when it is projected from an affixed cartridge case ignition of the calefacient material is automatically accomplished either by friction or percussion.

In FIG. 1 there is illustrated a fastener having a solid penetrating point 1 and welded thereto a hollow shank 2, the rear end of which is provided with any suitable fastening means such as threads 3. The bore of the shank is charged with a suitable heating composition 4. At the open end of the bore at which access may be had to the compositon, there is provided a flanged sleeve 5 for the purpose of enclosing the composition 4 with desired separation with respect to the threaded portion 3, and for capping it with an igniting mixture 6 which in this particular embodiment is a friction-sensitive match mixture.

In operation, the fastener of FIG. 1 preparatory to driving is placed with desired positioning in the bore of the barrel 7 of a suitable impact driving device preferably of the powder actuated type as shown. Power for driving is provided by the cartridge 8 seated in any suitable receiver such as the plug 9 at the breech of the tool barrel which is closed by a suitable block such as 15 having an opening 17 for entrance of the striker point of a firing pin 19 for setting off the cartridge. With the muzzle of the tool barrel 7 held against the surface of the body of frozen aggregate 100, the tool is put in operation so as to project and embed the fastener into the supporting body to a desired depth. The operator then strikes the match head 6 of the driven fastener thereby igniting the heating composition 4. During the course of burning of this composition, the shank portion 2 of the fastener becomes hot enough to cause localized melting of the ice in supporting body 100. After the burning of composition 4 has died out, the resultant water which has flowed into intimate contact with shank 2 refreezes and improves the hold on the fastener considerably.

In the embodiment of FIG. 2, the fastener pin consists of a solid piercing point 11 and threadedly secured thereon a hollow elongated shank portion 12, the rear end of which is provided with a transverse perforation 13 for the purpose of making desired connection to the pin after it has been driven. The cavity of the fastener is charged with a suitable heating composition 14 which is capped in this embodiment with a percussion-sensitive igniting mixture 16. The fastener is further provided with a cartridge case 18 fixed on the shank 12 and containing a suitable propellent charge 10 together with a primer.

In operation, the fastener pin of FIG. 2 is loaded into the bore of the barrel of a driving tool and projected therefrom into the surface of a mass of frozen material. The construction of this embodiment is such that the fastener provides not only its own propelling and heating charges but is of the self-igniting type. The blow provided by the propellant 10 sets off the ignition composition 16 which, in turn, starts the burning of the calefacient composition 14. Thus, simultaneously with the placement of the fastener in the frozen material, heating of the shank 12 of the fastener commences without further attention on the part of the operator.

In FIG. 3, for the purpose of readily understood illustration, the fastener is shown internally as it is before initiation of the driving operation but externally it is shown driven with respect to the fusible surrounding material 100. It follows that after firing and driving into material 100, its internal structure will be changed to the extent that the cap 25 has been expelled, the propellant 28 has all burned, igniter 26 has gone off and the burning composition 24 has been kindled and is either in the process of burning or has burned out and has permitted the melted part of material 100 to flow against the perforated shank 22 and resolidify about it.

In the embodiment of FIG. 3 the fastener having a solid point 21 is provided with a perforated shank 22 having a multiplicity of openings or perforations 27 between the exterior surface of the shank and its cavity. The core of this fastener consists not only of the charge of burning composition 24 but also of a charge of propellant 28. The rear end of the shank, as in the previous embodiments, is provided with suitable fastening means such as threads 23 and also with a primer cap 25 which requires a blow from a firing pin to set it off and ignite the propellent charge 28. Between the burning composition 24 and the propellent composition 28 there is a percussion cap 26 which requires a blow from the propellent charge 28 to set it off and in turn ignite the calefacient composition 24. It will be noted that the burning composition is also carried in the perforations 27. The exterior of the fastener, particularly at the perforations 27, may be coated with any suitable water proofing material such as wax and the like.

The operation of the fastener of this embodiment is similar to that of the fastener of FIG. 2 inasmuch as both are characterized by a train consisting of the burning composition, the igniter and the propellent charge in seriatim. With the fastener loaded into the barrel of a driving tool, the fastener is projected into the mass of supporting material 100 by setting off a chain of reactions beginning with a firing of the primer cap 25, followed by the ignition of the propellent charge 28, ignition of the percussion cap or composition 26 and finally terminating in burning of the composition 24. The perforations 27 enable better burning under certain conditions and more intense and widespread heat transmission desired for certain purposes. The perforations 27 serve not only to carry additional burning composition and increased heating and greater penetration into the surrounding supporting material but also serve as a form of surface roughness suited to accept the liquid material formed during melting and to provide a better lock or hold after refreezing.

In the embodiment of FIG. 4, the fastener pin has a penetrating point 31, a shank 32 and a rear end headed portion 33. The shank portion 32 is provided with a surface roughness such as by the addition of knurling or circumferential grooves or pitting for improvement of holding power. The burning composition takes the form of a coating or sheath 34 surrounding the shank 32. Protection for the burning composition 34 is afforded by means of a thin wrapping 35 of any suitable material such as paper, cellophane, or plastic. An ignition mixture 36 is disposed at the upper end of the sheath of calefacient composition 34 in the form of one or more match heads or a ring of any suitable match composition. Shank 32 is provided with knurling 37 for desired surface roughness.

In operation, the fastener of FIG. 4 after having been propelled by means of expanding gases from an independent explosive cartridge case penetrates into a mass of fusible material and in passage ignites itself as the match composition 36 encounters friction along the way. This form of fastener is adapted to heat the fusible material of the supporting body over a large area inasmuch as it does not rely upon conduction alone for heat transmission. Furthermore, the form of surface roughened shank and penetrating point with a shoulder is such as to enable an even more positive hold between the fastener and the recoalescing surrounding supporting material.

While a number of specific embodiments now believed to be preferred have been described in the foregoing, it will be understood that the invention is not limited thereto and that further changes and modifications may be made by those skilled in the art without departing from the spirit and scope of this invention as set forth in the appended claims.

Having described the invention, what I claim is:

1. A projectible fastener comprising a piercing point, an elongated shank portion, said point and shank portion adapted to be forceably driven into and remain intact in a solid heat softenable material and protectively housed therein, a core of calefacient material in said shank, said shank having a multiplicity of perforations forming discharge openings between said fastener-heating core and the exterior surface of said shank.

2. A projectile fastener comprising a solid point at the front end adapted for piercing a supporting material at least part of which is fusible, a brusting, impact, and fusion resistant hollow shank carrying a charge of calefacient material adapting upon kindling to heat the shank and the supporting material adjacent the shank to fusion when said point and shank are projected into said material, means at the rear end of the fastener for securing objects with respect to said projected fastener and supporting material, and a propellent cartridge separably affixed to said rear end for projecting said fastener, said fastener being of a caliber adapting it for projection by said cartridge from a driving tool barrel of said caliber.

3. The fastener of claim 2 also including means for igniting the calefacient material upon separation of said fastener and cartridge during projection.

4. A stud, pin or the like fastener of a caliber adapting it to be driven into a body of supporting material, at least a portion of which is fusible, by forcible projection from the bore of the barrel of an explosive actuated driving device to a depth of penetration into a surface of said body, said fastener comprising a piercing point, an elongated shank portion of a length extending at least over substantially all of the depth of penetration from said point to said surface and means associated with said shank for generating heat for heating said shank portion sufficiently to accomplish fusion of said material for recoalescence about a substantial portion of said shank to provide an improved securement of the driven fastener within said material, said driven fastener remaining intact.

5. A projectible fastener comprising a piercing point and an elongated shank portion, said shank portion having a fastener-heating charge of calefacient material and having an outer heating surface characterized by a plurality of recesses and intervening heat exchange partitions.

6. A fastener adapted to penetrate into fusible material and thereafter cause a melting and recoalescence of said material adjacent said fastener to form a more firm hold on the fastener which includes a multiperforated cavity and an ignitable heating composition within said cavity, said composition including a fugitive material adapted to escape from the cavity by way of the perforations and solidify to form extensions adherent to the fastener.

7. A fastener of the type described comprising a rigidly pointed metal pin of a caliber adapting it to be explosively projected from a barrel of said caliber with sufficient velocity to embed the front part of said fastener into a supporting material capable of undergoing a change of state at elevated temperatures while leaving a rear part protruding from said material for fastening purposes, said pin having affixed thereto a shank including in said front part a wall portion one side of which is adapted upon embedment to be put into heat exchange relationship with said material for changing the state of at least the adjacent part of said material and ultimately hardening it against said wall portion in retained relationship thereto and including in said rear part means for holding an object, said pin shank carrying on the other side of said wall portion a heat-generating material adapted upon activation to temporarily heat said wall portion to effect said change and hardening after projection of the fastener without melting down said wall portion, and also including an end means for starting ignition of said heat-generating material adjacent the rear part.

8. A fastener projectible from the barrel of a driving tool comprising a substantially rigid piercing point, an elongated shank portion mounted thereon, said point and shank portion being of an impact and fusion resistant material adapted by caliber to be forcibly driven into a solid heat softenable supporting material from a tool barrel of said caliber, and a charge of calefacient material protectively housed adjacent said shank and of a character for heating said fastener sufficiently to soften said supporting material without melting said shank portion, said charge being disposed alongside the shank in heat exchange relationship, and including means for ignition of said charge opposite said point and allowing said ignited charge to vent thereat.

9. The fastener of claim 8 wherein the point forms a radial enlargement of the shank, the calefacient material surrounds the shank and is protectively housed in a wrapping, said material and wrapping extending outwardly within the radial confines of said point, and wherein the ignition means is a match composition extending outwardly beyond said wrapper and material for frictional actuation.

10. A fastener projectible from the barrel of a driving tool, said fastener comprising an elongated hollow shank, a rigid piercing point on the front of said shank and a shank heating charge of calefacient material extending throughout substantially the entire length of said shank, said shank and point being of a caliber and material adapting said fastener to be forcibly projectible from a barrel of said caliber intact into at least partially fusible supporting target material, said calefacient material being of a type capable upon burning of heating said fusible part of the supporting material through said shank to fusion adjacent said shank while leaving said fastener intact for securement in said supporting material upon recoalescence about said point and shank.

11. A fastener projectible from the barrel of a driving tool, said fastener comprising an elongated hollow shank, a rigid piercing point on the front of said shank, said shank having a cavity extending throughout substantially the entire length of said shank from an opening at the rear, said cavity being charged with a core train consisting of a fastener heating calefacient material largely, and an explosive propellant adjacent the rear end of said shank, an igniter for said material between said material and propellant, and a propellant primer in said opening, said fastener having a caliber adapting it for projection from said barrel.

References Cited in the file of this patent

UNITED STATES PATENTS

| | | |
|---|---|---|
| 130,010 | Boone | July 30, 1872 |
| 384,662 | Zalinski | June 19, 1888 |
| 668,222 | Rose | Feb. 19, 1901 |
| 979,361 | Vulpescu | Dec. 20, 1910 |
| 1,275,462 | Nickerson | Aug. 13, 1918 |
| 1,299,869 | Steinmetz | Apr. 8, 1919 |
| 1,366,674 | Matthews | Jan. 25, 1921 |
| 1,548,456 | Goodman | Aug. 4, 1925 |
| 1,929,300 | Atkinson | Oct. 3, 1933 |
| 2,166,041 | Cox | July 11, 1939 |
| 2,308,103 | Pearson et al. | Jan. 12, 1943 |
| 2,309,887 | De Camp | Feb. 2, 1943 |
| 2,337,658 | Hick | Dec. 28, 1943 |
| 2,446,082 | Dixon | July 27, 1948 |
| 2,529,863 | Bowen | Nov. 14, 1950 |
| 2,561,676 | Ruff | July 24, 1951 |
| 2,653,504 | Smith | Sept. 29, 1953 |